March 10, 1953  H. D. BOGGS  2,630,600
PIPE EJECTING APPARATUS
Filed Oct. 3, 1950  4 Sheets-Sheet 1
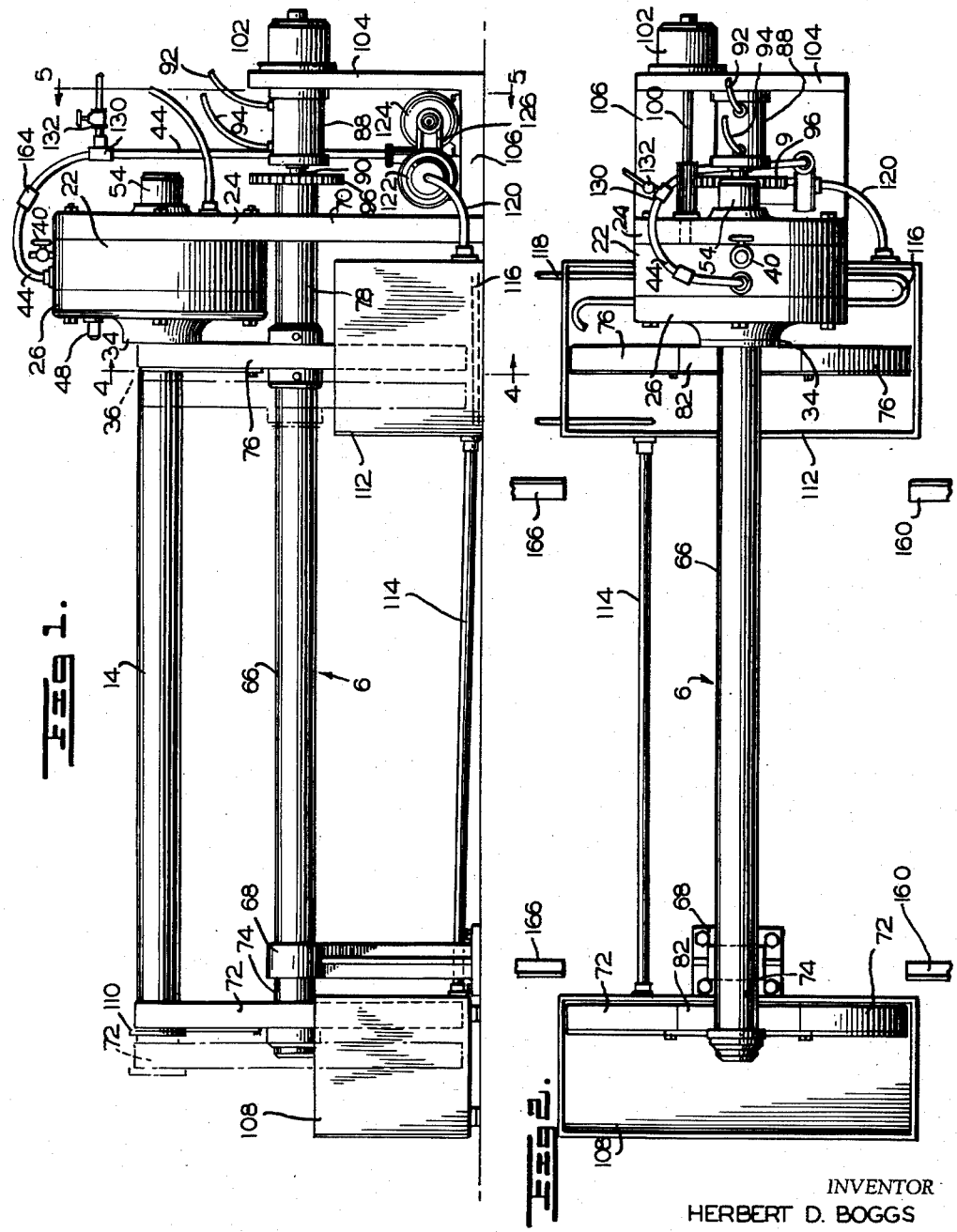
INVENTOR
HERBERT D. BOGGS
BY Cushman, Darby & Cushman
ATTORNEY March 10, 1953  H. D. BOGGS  2,630,600
PIPE EJECTING APPARATUS
Filed Oct. 3, 1950  4 Sheets-Sheet 2
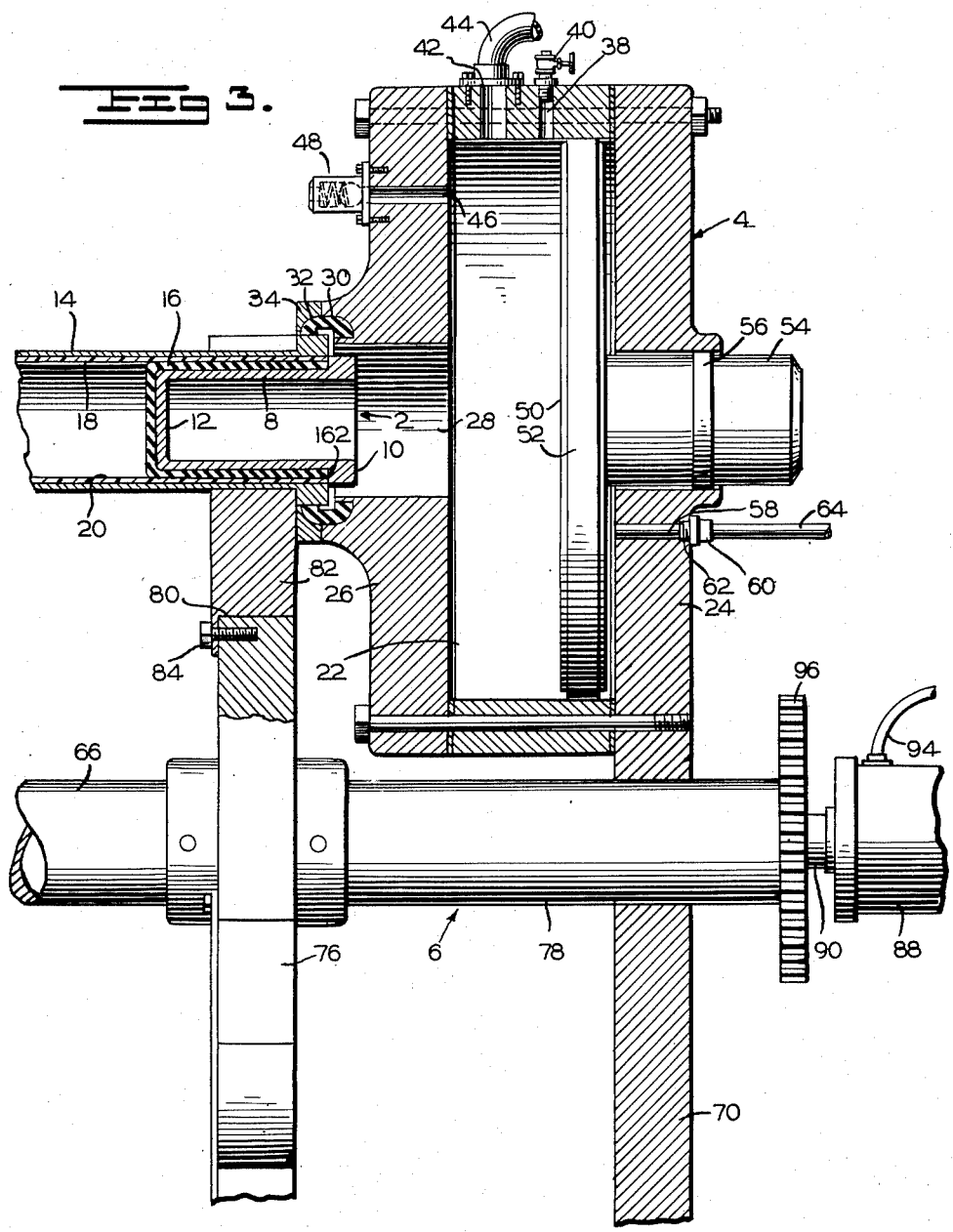
INVENTOR
HERBERT D. BOGGS
BY Cushman, Darby & Cushman
ATTORNEYS

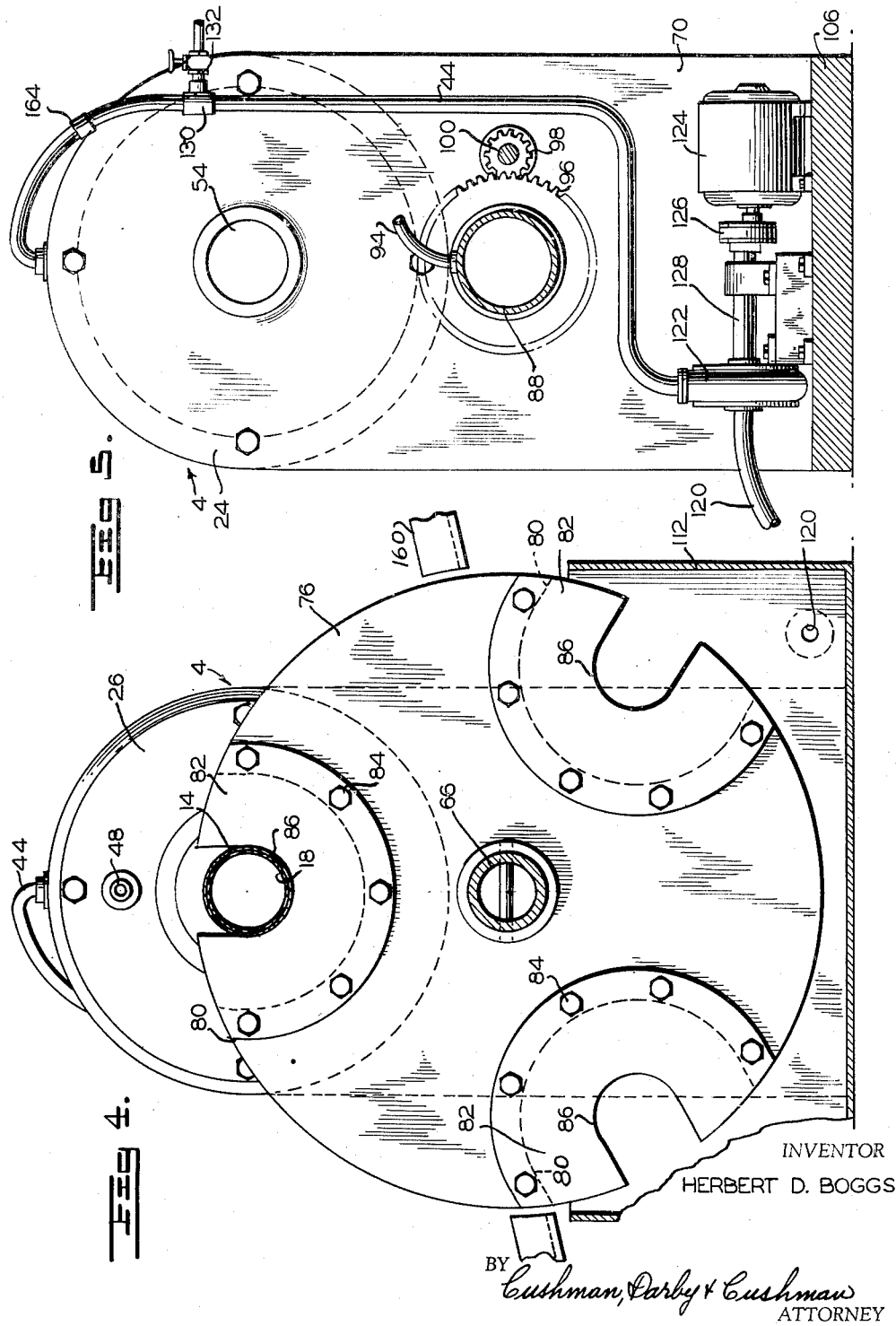

March 10, 1953  H. D. BOGGS  2,630,600
PIPE EJECTING APPARATUS
Filed Oct. 3, 1950  4 Sheets-Sheet 4
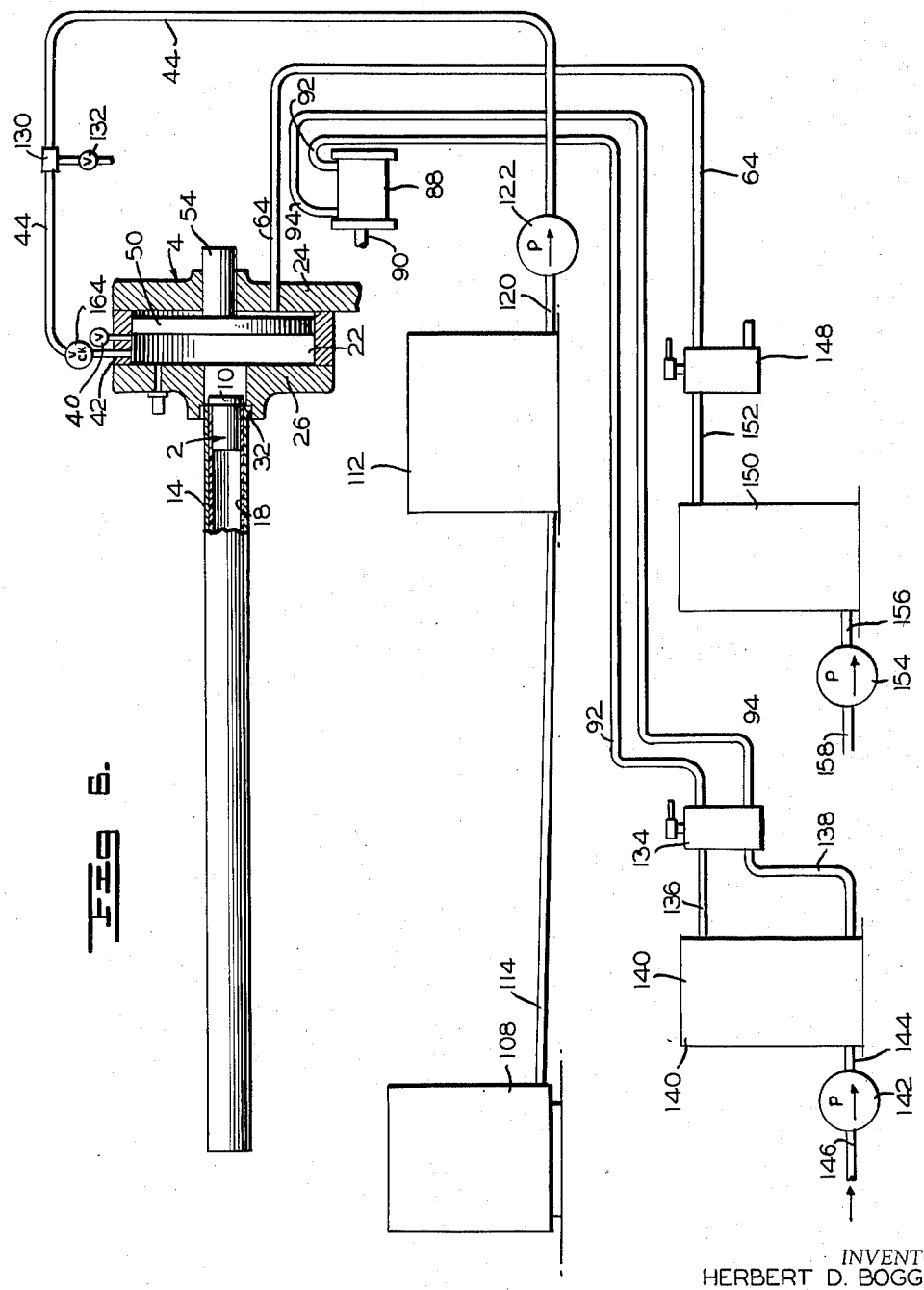
INVENTOR
HERBERT D. BOGGS
BY Cushman, Darby & Cushman
ATTORNEY Patented Mar. 10, 1953

2,630,600

UNITED STATES PATENT OFFICE 2,630,600

PIPE EJECTING APPARATUS

Herbert D. Boggs, Tulsa, Okla., assignor to H. D. Boggs Company, Ltd., Omaha, Nebr., a limited partnership Application October 3, 1950, Serial No. 188,242

4 Claims. (Cl. 18—1)

1

This invention relates to new improvements in methods for ejecting centrifugally cast pipe from the mold in which the pipe is cast.

Field of invention

One of the common methods of forming pipe, particularly pipe of large diameter, is to centrifugally cast it from metal, plastic compositions, or the like, in a mold of such dimensions as to form the desired shape and size. Subsequent to the pipe forming operation, it is necessary to eject or otherwise remove the fabricated pipe from the casting mold.

An extensive amount of work has been done on various devices for accomplishing this pipe ejection and many different forms of such apparatus have been devised. Each new form of pipe ejector is designed to provide certain new advantages, although all known forms of such pipe ejectors possess some disadvantages. One drawback of prior known pipe ejectors has been the need for long thrust rods designed to push the pipe out of the mold. Furthermore, the majority of known forms of pipe ejectors have been designed for handling metal pipe, and with the development of apparatus and methods for satisfactory fabrication of large diameter plastic pipe, it has been found that, in general, the apparatus designed for handling metal pipe is unsatisfactory for use with plastic pipe.

Objects

A principal object of this invention is the provision of a new method for the ejection of pipe from the mold in which it is cast. Still further objects include:

1. The provision of a new form of apparatus for ejecting pipes from the mold in which the pipe is cast.

2. The provision of such apparatus and methods particularly adapted to the handling of pipe made of plastic material.

3. The provision of such methods and apparatus adapted to handle many sizes of pipe with a minimum amount of the changing of apparatus parts.

4. The provision of such procedures and equipment which may be used to process relatively large numbers of cast pipes in a relatively short time.

5. The provision of pipe ejection apparatus which eliminates long thrust rods or other mechanically attached pipe engaging member.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

The new methods and apparatus of this invention may be comprehended by reference to the attached drawings in which:

Figure 1 is a side view of a preferred form of the type of pipe ejector apparatus with which this invention is concerned.

Figure 2 is a top view of the apparatus shown in Figure 1.

Figure 3 is an enlarged view, partly in section, of the hydraulic cylinder and pipe plug portion of the apparatus shown in Figure 1.

Figure 4 is an end sectional view of the apparatus of Figure 1, taken along the line 4—4 of Figure 1.

Figure 5 is an end sectional view of the apparatus of Figure 1, taken along the line 5—5 of Figure 1.

Figure 6 is a diagrammatic plan view showing the main working portion of the ejector apparatus of Figure 1, with the piping layout used to operate the hydraulic piston sections of the apparatus.

Detailed description

Referring in detail to the drawings, the apparatus consists essentially of a pipe sealing or plug member 2, means 4 for applying liquid under pressure to the plug member 2, and means 6 for positioning a pipe mold with the cast pipe therein in working relationship to the means 4.

The plug member 2 consists of a cylindrical body portion 8 provided at one end with a flange 10 and enclosed at the other end 12. The flange 10 is of such size that the outside diameter (hereafter abbreviated O. D.) thereof is less than the inside diameter (hereafter abbreviated I. D.) of the pipe mold 14.

The plug portion 8 is provided with a layer 16 on the outside thereof, of resilient material such as neoprene or rubber, with the portion 8 and layer 16 being of such size that the plug member 2 may be inserted inside the pipe 18 with the layer 16 making a pressed fit against the inside surface 20 of the pipe 18.

The liquid pressure applying means 4 consists of a cylinder 22 bolted to a base plate 24 and a cylinder head 26. The cylinder head has an axial port 28 with a recess 30 in the head surrounding the port 28. A resilient gasket 32 is clamped by ring member 34 into the recess 30. This gasket 32 and the associated parts serve as a sealing means for sealing the flanged end 36 of the pipe mold 14 to the port or conduit 28 for the purpose to be described more fully below.

The cylinder 22 is provided at the top thereof with a vent 38 into which there is threaded a valve 40, and with a fluid inlet 42 to which there is connected a liquid inlet pipe 44. The cylinder also contains a safety valve arrangement consisting of a side port 46 in the head 26 with a spring pressed ball escape valve 48 being connected to the outlet side of the port 46.

A piston 50 provided with a piston ring 52 is contained within the cylinder 22. The back side of the piston 50 has attached thereto a guide member or rod 54 which holds the piston 50 in axial alignment within the cylinder 22 and which rides in a gasket 56 carried in the base plate 24.

A hole 58 extends through the base 24 with a tube coupling 60 being threaded in the outer end 62 thereof. Tube 64 is connected to the coupling 60 to permit compressed air or other fluid to be introduced into the back part of the cylinder 22, so as to drive the piston 50 forward in the cylinder and subject any fluid contained therein to a pressure surge.

The mold indexing and positioning mechanism 6 comprises a shaft 66 journalled in two vertically upright supporting members 68 and 70, the latter comprising an extension of the cylinder base plate 24. A disk or plate 72 is fixed upon the end 74 of the shaft 66 and a second plate or disk 76 is fixed upon the other end 78 of the shaft 66.

As can be seen in Figure 4, the plates 72 and 76 are provided with a plurality of spaced recesses or cut-out sections 80 around the periphery, which are large enough to receive the largest size molds which would be processed through the apparatus. For handling smaller molds and pipe, adapter plates 82 are bolted by bolts 84 to the disk 76. These plates 82 are made to accommodate different sizes of pipe by having recesses 86 therein of such size as to receive the desired pipe mold, such as shown in Figure 4. When the apparatus is changed over from one size pipe to another, the adapter plates 82 in use are unbolted from the disk 76 and replaced with new plates having the proper size recesses 86.

The shaft 66 is both rotatable and longitudinally slidable in the supporting members 68 and 70. Longitudinal sliding or reciprocation of the shaft 66 is accomplished by the hydraulic cylinder and piston unit 88. Thus, the double acting piston in the unit 88 is fastened at the rod 90 to the end 78 of the shaft 66. Through the hydraulic liquid lines 92 and 94, the drive rod 90 may be moved in and out, thus moving the shaft 66. Such movement, in turn, clamps the mold and its contained pipe into sealing engagement with the liquid cylinder port 28, as shown in Figures 1 and 3, while the movement of the rod 90 in the opposite direction unclamps the mold and pipe from the cylinder 22 after ejection of the pipe, as shown in dotted lines in Figure 1.

A gear 96 is fastened, such as by welding, to the end 78 of the shaft 66. This gear meshes with the pinion 98 carried on the shaft 100 extending from the drive motor 102. The pinion 98 is longer than the horizontal movement distance for the shaft 66, so that the gear 96 may be moved back and forth with the shaft 66 while staying meshed with the pinion 98.

The motor 102 and hydraulic unit 88 and associated parts are supported upon the upright member 104, which, in the apparatus shown in the drawings, is integral with the base plate 106 and the support 70 and extension 24 thereof.

The pipe layout for the apparatus can be seen by reference to Figures 1, 2 and 6. Surrounding the plate 72 is a drain pan 108 designed to catch fluid which drains from the end 110 of the mold 14. Similarly, there is a storage tank and drain tank 112 surrounding the plate 76 beneath the end 36 of the mold to catch liquid draining from this end of the mold. A pipe 114 connects the tank 108 with the tank 112 to allow liquid to drain by gravity from the tank 108 into the tank 112. In the base of the tank 112 are coils 116, the inlet 118 of which is connected to a source of steam so that the contents of the tank 112 may be heated.

A pipe 120 leads from the tank 112 to a pump 122 which is driven by the motor 124 through the pulley 126 and shaft 128. The pump 122 takes liquid from the tank 112 through the pipe 120 and delivers it to the inlet 42 of the cylinder 22 through the pipe 44. A T 130 is contained within the pipe line 44 so that additional liquid, such as water, can be introduced into the line from an external source (not shown) through the valve 132.

The hydraulic cylinder unit 88 is motivated by hydraulic pressure through the lines 92 and 94 connected through the control valve 134 and pipes 136 and 138 to a pressure tank 140. Liquid in the tank 140 is maintained under pressure by the pump 142 which is connected to the tank by pipe 144 with the intake side of the pump joined to a storage liquid source (not shown) by the pipe 146.

Fluid under pressure for activating the piston 50 is delivered to the pipe or tube 64 through the control valve 148 connected to the pressure tank 150 by tube 152. A pressure pump 154 connected to the tank 156 maintains fluid in the tank 150 under pressure by compression of fluid delivered through the inlet tube 158 from a fluid source, not shown.

*Description of operation*

With the arrangement of parts in the new apparatus in this invention in mind as described above, an outline of the steps involved in ejection of pipe from a casting mold, in accordance with this invention, may now be undertaken.

Molds with the cast pipe contained therein are conveyed from a source of supply, such as the pipe casting station on rail conveyors 160. Slow rotation of the shaft 66 and the attached disks 72 and 76 brings the disk into position where a mold drops into the receiving recesses 86. Continued rotation of the shaft 66 then lifts the mold into an elevated horizontal position, such as shown in the dotted section in Figure 1. At this point, motor 102 is shut off so that the pinion 98 stops turning the shaft 66 through the gear 96.

Shortly before the pipe mold and pipe are picked up from the conveyor tracks 160, or during the time when the pipe mold is being elevated by the plates 72 and 76, a plug 2 of the right size for the pipe being ejected is forced into the end of the pipe so that the base 162 of the flange 10 seats against the edge of the pipe 18.

With the plug sealing the end of the pipe 18 and the mold and pipe stopped in the elevated position, the hydraulic cylinder 88 is actuated by control of the valve 134 to force liquid through the line 94 into the hydraulic unit 88, whereby the shaft 66 is moved toward the cylinder 22. This causes the mold end 36 to move into the open end of the port 28 and to make a sealed connection with the resilient gasket 32.

Vent valve 40 is opened and liquid pumped through pump 122 from the tank 112 into the cylinder 22. Preferably, the liquid used for this purpose is a dilute aqueous solution of a silicon resin, or some similar wetting or lubricating agent, with the solution being heated near the boiling point by the heating coils 116.

As soon as the cylinder 22 is filled, as can be determined by the liquid issuing from the vent 38, the valve 40 is closed.

Intermittent surges of pressure are now applied to the liquid in cylinder 22 by sudden application of fluid pressure to the piston 50 through the line 64 with proper operation of the valve 148. A check valve 164 is contained in the fluid line 44 to prevent these surges of pressure from backing up to the pump 122.

The pressure surges on the liquid in the cylinder 22 exert a thrust upon the plug member 2, which, in turn, causes the pipe to break loose from the mold 14. After this original freeing operation, sufficient pressure can be delivered by the pump 122 to force the plug 2 and pipe 18 out of the mold, although, if resistance to movement by the pipe becomes high, further intermittent surges of pressure can be applied to the liquid by movement of the piston 50 in the same fashion as just described.

Application of liquid pressure is continued until the pipe and plug are forced completely out of the mold or forced a sufficient distance to permit the pipe to be pulled by hand or other suitable means from the mold. At this point liquid in the mold and cylinder 22 drains either into tank 108 or 112, where it is stored for the next pipe ejection.

Motor 102 is again turned on so that plates 72 and 76 are revolved to drop the emptied mold 14 upon the removal conveyor racks 166, and at the same time pick up a new mold with the pipe contained therein from the tracks 160. At this point, the operation as described above is repeated and the steps continued until pipes of one size have been completely processed. It will be understood that the racks 160 will be positioned slightly above the shaft 66 so that the molds will fall into the recesses 86 and be retained by gravity therein. Similarly the racks 166 will be slightly below the level of shaft 66 so that the molds will roll out of recesses 86 and onto racks 166 by action of gravity.

When a new size pipe is to be ejected, in accordance with this invention, the apparatus is quickly and easily modified to adapt it to the new size. This is accomplished by removing the cylinder head 26 and replacing it with a new head having the required port size. At the same time, the ejector plates 82 are removed from the disks 72 and 76 and replaced with new size plates. Then, as the new pipe is delivered and positioned, the end plugs 2 are replaced with new sized plug members.

*Conclusions*

As can be seen from the detailed description above, the present invention provides new apparatus and new methods for the ejection of pipe from the mold in which it is cast. This is accomplished quickly with a minimum requirement of manual handling and without need for the use of long drive rods or similar parts which have always presented troublesome mechanical problems in the past. Furthermore, the new apparatus and methods are relatively gentle in their action upon the pipe, making them unusually well suited for handling of non-metallic pipe, e. g., plastic pipe. Finally, the new procedures and equipment are attractive because they are quickly and easily adapted to all sizes of pipes and require only a minimum of additional elements to accomplish this adaptation.

I claim:

1. Apparatus for ejecting a length of pipe from a mold in which the pipe has been cast, said apparatus comprising supporting means for retaining the mold, a cylinder in juxtaposition to the supporting means, the cylinder having an outlet port for receiving one end of the mold for sealed retention therein, a plug abutting the pipe at the said one end of the mold and slidable within the mold, and means for applying pressure on the plug to drive the pipe from the mold, the just mentioned means comprising a free piston within the cylinder, means to fill the cylinder with liquid on the side of the piston adjacent the plug, and means to apply fluid under pressure into the cylinder to the opposite side of the piston, the arrangement being such that movement of the piston over its possible travel in the cylinder will force the plug and therefore the pipe in an ejecting direction within the mold.

2. Apparatus as in claim 1 wherein the means for applying pressure to said opposite side of the piston includes intermittently operable valve means.

3. Apparatus for ejecting pipe from the mold in which it is cast comprising an unattached cylindrical plug having a flange on one end thereof, the outside diameter of which is substantially equal to the outside diameter of the pipe to be ejected, the unflanged longitudinal portion of the plug being provided with a layer of resilient material having an outside diameter substantially equal to the inside diameter of said pipe, means for subjecting said plug to a pressure surge of a liquid comprising a cylinder, a cylinder head thereon having an axial port of slightly larger outside diameter than said plug flange outside diameter, sealing means surrounding said port for making liquid-tight connection between a pipe mold in which a pipe is cast and said port, a piston within said cylinder, a second port in said cylinder on the opposite end thereof from said first port, an inlet for hydraulic fluid to said cylinder, and a relief valve connected into said cylinder, and means for conveying a pipe casting mold with a cast pipe therein into position for ejection of the pipe from the mold comprising a shaft journalled in upright supports for longitudinal and rotational movement, a disk fixed upon each end of said shaft, a plurality of spaced peripheral mold receiving recesses in said disks, means for rotating said shaft, and means for reciprocating said shaft longitudinally.

4. Apparatus for the ejection of a pipe from the mold in which it is cast comprising in combination a shaft journalled in an elevated horizontal position upon a pair of vertical supporting members for horizontal reciprocation and rotational movement, a circular plate fixed upon each end of said shaft, a plurality of spaced recesses in the periphery of said plates for receiving a pipe mold, a double acting hydraulic piston attached to one end of said shaft for reciprocating the shaft, a gear mounted concentrically upon said shaft, an elongated pinion meshing with said gear positioned to allow said gear to slide horizontally thereto while meshed therewith, a motor connected to said pinion for rotation thereof, a hydraulic cylinder mounted above said shaft with the cylinder axis parallel to said shaft, an axial port in the head of the cylinder, a resilient gasket unit upon the end of said port for sealing the end of a pipe casting mold to said port, a piston in said cylinder, an inlet in said cylinder for filling the cylinder with liquid, means for advancing said piston to pressurize liquid contained in said cylinder, and a plug member for sealing the end of a pipe to be ejected from a casting mold and receive the pressurized liquid through said cylinder port comprising a cylindrical member which will insert into the pipe to be ejected having a flange on one end thereof of such size that it will bear against the end of said pipe while passing through the bore of said mold and a resilient layer upon said cylindrical member for making a press-fit engagement with the inside surface of a pipe to be ejected from a mold.

HERBERT D. BOGGS.

REFERENCES CITED

The following references are of record in the file of this patent:

UNITED STATES PATENTS

| Number | Name | Date |
|---|---|---|
| 1,810,183 | Mathieu | June 16, 1931 |
| 1,960,366 | Barr et al. | May 29, 1934 |
| 2,361,026 | Greene | Oct. 24, 1944 |